US009426479B2

(12) United States Patent
Shaffer

(10) Patent No.: US 9,426,479 B2
(45) Date of Patent: Aug. 23, 2016

(54) PRESERVING CAPTIONING THROUGH VIDEO TRANSCODING

(75) Inventor: Gary Shaffer, Apex, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 896 days.

(21) Appl. No.: 12/672,434

(22) PCT Filed: Aug. 7, 2008

(86) PCT No.: PCT/US2008/009476
§ 371 (c)(1),
(2), (4) Date: Feb. 5, 2010

(87) PCT Pub. No.: WO2009/023120
PCT Pub. Date: Feb. 19, 2009

(65) Prior Publication Data
US 2011/0164673 A1 Jul. 7, 2011

Related U.S. Application Data

(60) Provisional application No. 60/954,907, filed on Aug. 9, 2007.

(51) Int. Cl.
H04N 19/40 (2014.01)
H04N 21/488 (2011.01)
(Continued)

(52) U.S. Cl.
CPC ............... *H04N 19/40* (2014.11); *H04N 5/278* (2013.01); *H04N 7/0885* (2013.01); *H04N 21/234* (2013.01); *H04N 21/235* (2013.01);
(Continued)

(58) Field of Classification Search
CPC ..... H04N 7/52; H04N 5/9201; H04N 21/236; H04N 21/23614
See application file for complete search history.

(56) References Cited

U.S. PATENT DOCUMENTS 5,294,982 A    3/1994  Salomon et al.
5,583,577 A *  12/1996 Tsukagoshi ............ H04N 5/278
                                                348/468

(Continued)

FOREIGN PATENT DOCUMENTS

EP      1 809 028 A1    7/2007
WO      WO 95/15660     6/1995
(Continued)

OTHER PUBLICATIONS

J. Soulie, "Input / Output with files", C++ Language Tutorial (Dec. 23, 2008); available online at http://web.archive.org/web/20090410053800/http://www.cplusplus.com/doc/tutorial/files.*

(Continued)

*Primary Examiner* — David N Werner
(74) *Attorney, Agent, or Firm* — Patent Capital Group

(57) ABSTRACT

Methods of preserving captioning information in an input video stream through transcoding of the input video stream include extracting caption data from the input video stream, translating the caption data into at least one output caption format, packaging the translated caption data into data packets for insertion into a video stream, synchronizing the packaged caption data with a transcoded version of the input video stream, receiving a preliminary output video stream that is a transcoded version of the input video stream, and combining the packaged caption data with the preliminary output video stream to form an output video stream. Related systems and computer program products are also disclosed.

25 Claims, 5 Drawing Sheets

(51) Int. Cl.
*H04N 21/4402* (2011.01)
*H04N 5/278* (2006.01)
*H04N 21/236* (2011.01)
*H04N 21/234* (2011.01)
*H04N 21/242* (2011.01)
*H04N 7/088* (2006.01)
*H04N 21/235* (2011.01)
*H04N 21/2362* (2011.01)
*H04N 21/2343* (2011.01)
*H04N 21/233* (2011.01)

(52) U.S. Cl.
CPC ......... *H04N21/236* (2013.01); *H04N 21/2355* (2013.01); *H04N 21/2362* (2013.01); *H04N 21/242* (2013.01); *H04N 21/440218* (2013.01); *H04N 21/4884* (2013.01); *H04N 21/233* (2013.01); *H04N 21/2335* (2013.01); *H04N 21/2343* (2013.01); *H04N 21/234309* (2013.01)

(56) References Cited

U.S. PATENT DOCUMENTS

| | | | | |
|---|---|---|---|---|
| 5,731,847 | A * | 3/1998 | Tsukagoshi | H04N 21/8126 348/569 |
| 5,889,564 | A * | 3/1999 | Tsukagoshi | G11B 27/034 348/473 |
| 6,097,439 | A * | 8/2000 | Goldberg | 348/465 |
| 6,141,447 | A * | 10/2000 | Linzer et al. | 382/236 |
| 6,587,635 | B1 | 7/2003 | Subramanian et al. | 386/239 |
| 6,771,703 | B1 * | 8/2004 | Oguz et al. | 375/240.03 |
| 6,900,845 | B1 * | 5/2005 | Christopher | H04N 5/4401 348/445 |
| 6,952,236 | B2 * | 10/2005 | Orr | 348/465 |
| 7,177,520 | B2 * | 2/2007 | Zetts | 386/281 |
| 7,224,890 | B2 * | 5/2007 | Kato | H04N 19/188 348/E5.002 |
| 7,725,006 | B2 * | 5/2010 | Van Gestel | G11B 20/10527 386/241 |
| 8,194,143 | B2 * | 6/2012 | Tomita et al. | 348/220.1 |
| 2002/0191956 | A1 * | 12/2002 | Morishima et al. | 386/52 |
| 2003/0007096 | A1 * | 1/2003 | Katayama et al. | 348/564 |
| 2004/0146111 | A1 * | 7/2004 | Dutey | H04N 5/4401 375/240.25 |
| 2007/0081587 | A1 * | 4/2007 | Raveendran et al. | 375/240.1 |
| 2008/0129864 | A1 * | 6/2008 | Stone | H04N 7/0885 348/468 |
| 2009/0009661 | A1 * | 1/2009 | Murakami et al. | 348/468 |
| 2009/0303382 | A1 * | 12/2009 | Hamada | H04N 9/8233 348/468 |

FOREIGN PATENT DOCUMENTS

| | | |
|---|---|---|
| WO | WO 97/35437 | 9/1997 |
| WO | WO 2007/000559 A1 | 1/2007 |
| WO | WO 2007/038702 A1 | 4/2007 |
| WO | WO 2009/023120 | 2/2009 |

OTHER PUBLICATIONS

International Search Report and Written Opinion for PCT/US2008/009476 mailed Feb. 16, 2009.
European Search Report corresponding to European Application No. 10 190 879.6, mailed Sep. 11, 2012 (10 pages).
PCT Feb. 9, 2010 International Preliminary Report on Patentability from PCT/US2008/009476.

* cited by examiner

PRESERVING CAPTIONING THROUGH VIDEO TRANSCODING

CROSS-REFERENCE TO RELATED PATENT APPLICATION

The present application claims the benefit of and priority to U.S. Provisional Patent Application No. 60/954,907, filed Aug. 9, 2007, entitled "Preserving Captioning Through Video Transcoding," the disclosure of which is hereby incorporated herein by reference in its entirety.

BACKGROUND

For decades, television programs have optionally included closed caption (CC) information. Closed captions are rows of text that can be optionally displayed on a television picture. The two main uses of closed captions are to present a visual representation of the audio track for hearing-impaired viewers and to present a visual representation of the audio track in a different language.

Since the 1970s the United States Federal Communications Commission (FCC) has required closed captions to be included with television broadcasts in many instances. Closed caption data includes text to be displayed and other information, such as control codes, that specify the location and/or appearance of the text. Today, this closed caption data can be inserted into a television broadcast in a number of ways. Previously, there was only one way to insert closed caption data into a television broadcast. Namely, CC data was transmitted using a special line of National Television Standards Committee (NTSC) format video (line 21) that is transmitted to televisions but that is not displayed. At the television transmitter, the closed caption data is converted to intensity pulses in this special video line. The receiving television recognizes the pulses in this special line of video and converts the pulses back into closed caption data. The television then interprets the closed caption data and displays the captions (text) on the picture.

CC data is carried in two fields, CC Field 1 and CC Field 2. CC Field 1 carries two interleaved channels, CC1 and CC2, while CC Field 2 carries two additional interleaved channels, CC3 and CC4. Multiple CC channels are defined, so that a program can be encoded, for example, with CC data for multiple languages. To separate the interleaved data into individual data streams, such as CC1 and CC2 data streams, the data bytes are interpreted into control codes and characters as specified in the Consumer Electronics Association (CEA) standard CEA-608-C.

In recent years, there have been a number of technological changes in how television programs are stored and transmitted. The most fundamental change is that digital storage and transmission of television signals has largely replaced analog storage and transmission. Analog storage (VHS tapes, for example) and analog transmission (over-the-air antenna, for example) have been replaced almost completely by digital storage (DVD for example) and digital transmission ("Digital Cable" and satellite for example). The digital formats generally do not include the special line of video that analog broadcasts use to transmit closed caption data, so a new method of carrying closed caption data was needed. The MPEG2 compression format, which until recently was used by essentially all digital broadcasts for transmitting video, allows for optionally including digital closed caption data as user data with every frame. Other digital formats include serial digital interface (SDI), which is an uncompressed digital signal transmitted at 270 Mb/sec, and which is typically used for connecting video equipment within a video processing facility, for example a television studio. Asynchronous serial interface (ASI) is a compressed digital signal that operates at 270 Mb/sec and contains one or more compressed video streams.

In the mid 1990s, a new closed caption format referred to as DTVCC (Digital Television Closed Captions) was created, and is defined by the standard CEA-708-B. DTVCC takes advantage of the additional capacity available in digital transmissions, which allows roughly ten times as much caption data to be transmitted compared to CC data. As a result DTVCC can be used to display similar and more elaborate captions than CC. DTVCC data is organized into 63 channels or "services," which are interleaved together. To separate the data into constituent channels (or services) the DTVCC data is interpreted according to the standard CEA-708-B. As the FCC continues to require broadcasters to transition to digital television (DTV) broadcasts, more programs are being created that include DTVCC captions.

However, many consumers still do not have a television capable of displaying DTVCC captions. Thus, programs are often created and transmitted with both CC and DTVCC captions. Additionally, there is a multitude of content from the last several decades that was created with CC captions, but no DTVCC captions.

Captions and subtitles for video programs can be stored in other formats. For example, SAMI (Synchronized Accessible Media Interchange) is a caption format developed by Microsoft. SAMI is designed to support the creation of captions for media playback on a PC, and is better suited to interne streaming than cable or satellite broadcast purposes. SAMI captions are stored and transmitted separately from the video and are synchronized with the video using timestamps. SAMI captions are typically used when video is played back on a computer using a program such as Microsoft MediaPlayer. Similarly, subtitles are stored in various file formats and can also be carried in MPEG2 transport streams.

Teletext data can also be used for subtitles and captions. Teletext data can be carried in a number of ways, including within an MPEG2 transport stream, in various text and binary file formats, in lines of an analog PAL (Phase Alternating Line) video signal and/or in lines of a PAL SDI video signal. Typically, teletext data is encoded in multiple lines (5 or 10 per field) in an analog video signal. In a digital video stream, teletext data can be stored at a multiplexed transport stream level. For example, a multiplexed signal can include a video stream, an audio stream, and a teletext/subtitle stream, including teletext packets that are tagged with time stamps for synchronization. PAL does not provide a facility to carry CC data on line 21 of the signal, so the caption data must be either be translated into teletext data (which can be inserted into a PAL format electrical video signal) or subtitles which can be displayed as text on the video pictures.

Recently, the VOD (Video On Demand) industry has emerged. A VOD system provides a library of video programs from which the customer can choose. The customer selects a program, and it is delivered to the customer's VOD player over digital satellite, digital cable, and/or computer networks. To create the VOD library, the original programs have to be converted to a digital format that is compatible with the VOD player. This typically involves converting from analog to digital, encoding (also referred to as compressing), re-encoding or trans-coding the original program. Also in the last several years, two newer digital video formats have emerged along side MPEG2, and will likely replace MPEG2. These two formats are H.264 and SMPTE421M (VC-1). VOD content is being created in both of these new formats.

SUMMARY

Some embodiments of the invention provide methods of preserving captioning information in an input video stream through transcoding of the input video stream. The methods include extracting caption data from the input video stream, translating the caption data into at least one output caption format, packaging the translated caption data into data packets for insertion into a video stream, synchronizing the packaged caption data with a transcoded version of the input video stream, receiving a preliminary output video stream that is a transcoded version of the input video stream, and combining the packaged caption data with the preliminary output video stream to form an output video stream.

The methods may further include detecting caption data underflow or overflow in the extracted caption data, and compensating for caption data underflow or overflow in the extracted caption data. Compensating for caption data underflow or overflow in the extracted caption data may include adding null data to the caption data in the case of caption data underflow and deleting null data in the caption data in the case of caption data overflow.

The methods may further include correcting information and/or coding errors in the extracted caption data.

The methods may further include converting the extracted caption data into an intermediate format before translating the extracted caption data. Translating the extracted caption data may include translating the extracted caption data from the intermediate format into the at last one output captioning format. Translating may also include pass-through of the extracted caption data without modification.

The methods may further include buffering the extracted caption data before packaging the extracted caption data.

The methods may further include parsing the input video stream to determine a presentation order of encoded frames in the input video stream, and reordering the extracted caption data into the presentation order of encoded frames in the input video stream before translating the caption data. Parsing the input video stream may include assigning time stamps to the caption data.

In some embodiments, the methods may further include parsing the preliminary output video stream to determine a coded order of encoded frames in the preliminary output video stream, and reordering the packaged caption data into the coded order of encoded frames in the preliminary output video stream before combining the packaged caption data with the preliminary output video stream.

The methods may further include transmitting a target encoding bit rate to a video encoding module in response to an amount of extracted or expected caption data.

Combining the translated caption data with the preliminary output video stream may include inserting the packaged caption data into spaces reserved in user data of the preliminary output video stream. In some embodiments, the reserved space may not be physically created by a video encoder. Rather, the encoder may output a compressed video frame, and a video/caption combiner may insert user data bytes either before or after the compressed video frame.

A system for preserving captioning information in an input video stream through transcoding of the input video stream according to some embodiments includes a caption extraction module configured to extract caption data from the input video stream, a caption processing module configured to translate the extracted caption data into at least one output caption format, and a caption packaging module configured to synchronize the translated caption data with a preliminary output video stream that is a transcoded version of the input video stream.

The system may further include a plurality of input queues corresponding to respective caption formats, the caption extraction module is configured to store the caption data in one or more of the input queues and the caption packaging module is configured to retrieve caption data for packaging from the input queues.

The caption extraction module may be configured to compute an amount of caption data to be packaged by the caption packaging module to avoid caption data overflow or underflow.

The caption packaging module may be configured to organize the translated caption data into caption data packets that are to be inserted into the preliminary output video stream.

The system may further include a caption input reorder queue that is configured to reorder the extracted caption data into a presentation order of the input video stream to accommodate differences in presentation or coding order between the input video stream and the preliminary output video stream.

The system may further include a caption output reorder queue that is configured to reorder the packaged caption data into a coding order of the preliminary output video stream.

The system may further include a caption/video combining module that is configured to insert the packaged caption data into the preliminary output video stream to form an output video stream.

The caption packaging module may be configured to provide a target bit rate to a video processing module based on an amount of caption data to be inserted into the preliminary output video stream.

The caption packaging module may be configured to obtain frame ordering and/or timing information for the preliminary output video stream from a video processing module that performs transcoding of the input video stream.

A system for preserving captioning information in an input video stream through transcoding of the input video stream according to further embodiments includes a caption extraction module configured to extract caption data from the input video stream, a caption processing module configured to translate the extracted caption data into at least one output caption format, and a caption packaging module configured to generate packaged caption data for insertion into an output video stream and to provide the packaged caption data to a video processing module that transcodes the input video stream. Related computer program products are also provided.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
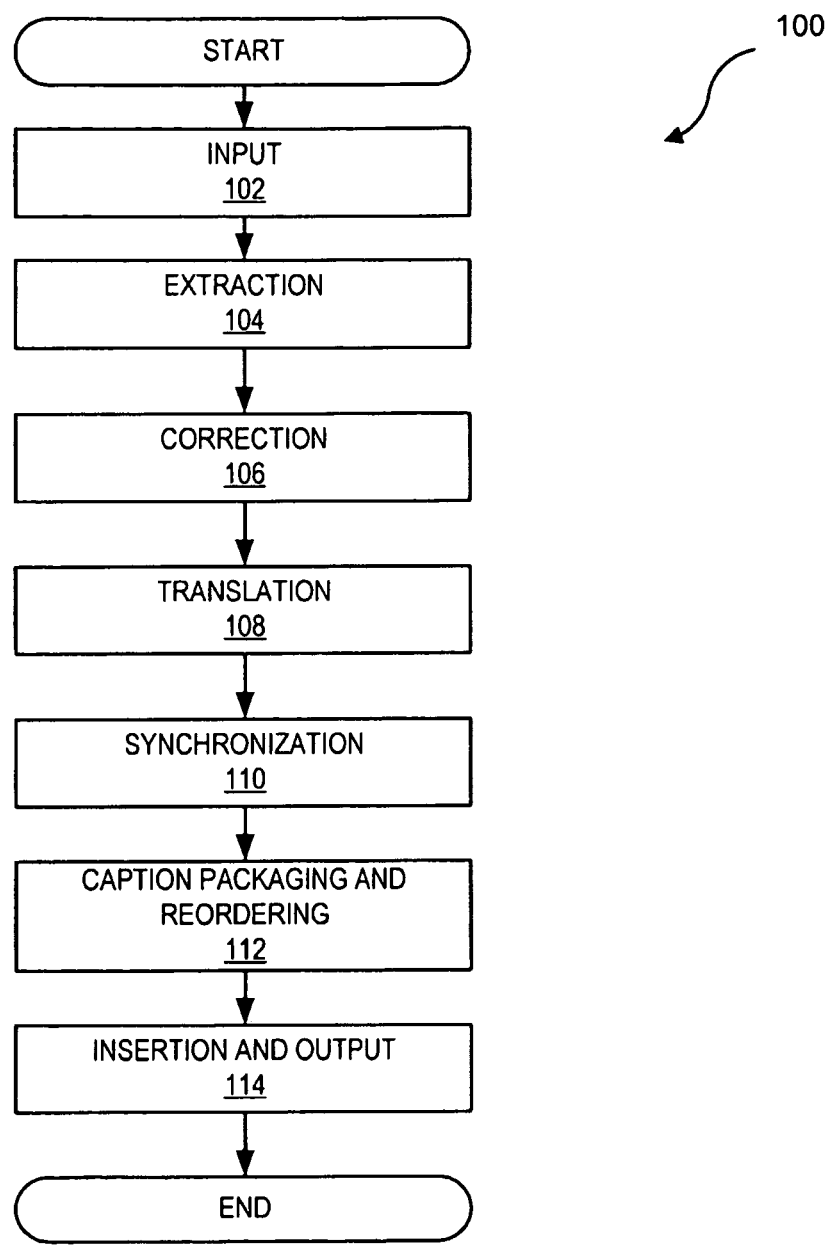
FIG. 1 is a flowchart illustrating caption processing systems/methods according to some embodiments.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, a software embodiment that is embodied in a tangible computer-readable medium, or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Embodiments of the present invention provide systems and/or methods that can preserve and/or translate captioning information during video processing. A video transcoding system according to some embodiments preserves captioning information by receiving audio, video and caption data, transcoding the video and caption data, and combining the audio data and the transcoded video and caption data. It will be appreciated that audio is usually present along with a video signal. However, the audio processing is generally performed on an independent path and may not affect caption processing, although it is desirable that the audio signal stay in sync with video signal and captions.

Preservation of captioning data may be more complicated when one or more of a number of situations exist. For example, preservation of captioning data may be more difficult when input or output video frames must be reordered, or if the input frame rate is different from the output frame rate. In addition, preservation of captioning data may be more difficult if video frames are discarded by encoder/multiplexer, if there is a caption data underflow or overflow at the input to the video processor, and/or if caption data is corrupted at the input to the video processor. Furthermore, preservation of captioning data can become complicated if there is a need to translate CC data to DTVCC data or if there is a need to translate CC or DTVCC data to subtitles, teletext or SAMI. Finally, corrupted and/or poorly authored caption data can complicate caption processing. Each of these situations is discussed in more detail below.

Reordering Input

When, digital video is stored or transmitted, the video frames are often stored or transmitted in a different order (referred to as the "coded order") than they are displayed (referred to as the "display order" or "presentation order"). The CC and DTVCC data is usually stored or transmitted in the same order (coded order) as the video. Therefore, some embodiments reorder caption data from coded order to presentation order before processing/translating the caption data. In order to reorder the caption data at the input, the input digital video stream may be parsed to determine the relationship between coded order and presentation order.

Reordering Output

Similarly to input reordering, some embodiments reorder caption data from presentation order to coded order before it is inserted into a digital video output stream. In some embodiments, the video processor handles this reordering task. In other embodiments, reordering may be performed by a caption processor. In general, a caption processing system according to some embodiments may determine the correct (coded) order of the outgoing digital video stream so the caption data can be built up into correctly formed chunks and inserted into the correct locations of the digital video stream relative to the video frames.

Input Frame Rate is Different from Output Frame Rate

Often the number of video frames (or pictures) per second of the input video stream is different from the number of video frames per second of the output video stream. For example, a system could convert 30 frames per second to 24 frames per second. In this case, systems/methods according to some embodiments may buffer and repackage the incoming caption data into different-sized chunks for insertion into the 24 frame per second (fps) output. It is also possible that the output frame rate could change, for example, from 24 to 30 and back. A capture preservation system/method according to some embodiments may be configured to dynamically react to such output frame rate changes.

Video Frames are Discarded by Encoder or Multiplexer

In the imperfect world of video encoding, sometimes an encoder or multiplexer discards a video frame rather than causing the output of the system to exceed a transmission bandwidth limitation. If this happens, to preserve the caption data that would have been associated with the (discarded) video frame, a caption processing system/method according to some embodiments may recognize when a video frame has been discarded and insert its associated caption data either earlier or later in the output video stream, if possible.

Caption Data Underflow or Overflow at Input

The various CC and DTVCC standards specify how much caption data should be associated with each frame of video. If the input source violates the rules such that either too little or too much caption data is presented at the input, a caption processing system/method according to some embodiments may react by producing the correct amount of correctly formatted caption data, and staying in sync with the video processing.

Translating CC to DTVCC

If the input caption data consists of CC (with no corresponding DTVCC), a caption processing system/method according to some embodiments may translate the CC to DTVCC.

Translating CC or DTVCC to SAMI, Subtitles, or Teletext

In some embodiments, a video processor may be configured to output completely different caption formats, such as SAMI, subtitles, and teletext, in addition to (or instead of) CC and DTVCC.

Corrupt Caption Data

It is common for some caption data to be corrupted as a result of transmission errors or line 21 decoding errors, for example. Transmitting CC using line 21 of a video signal is especially prone to errors. While the FCC specifies what a caption decoder should do in the event of an error (e.g. display a solid block instead of a corrupt character), it may be desirable to have a different error-handling scheme if FCC rules do not prohibit such behavior. For example, an automated spelling checker may be used in some embodiments to automatically replace corrupt or missing characters. When replacing missing characters, it is important for the repaired caption to maintain compliance with the relevant format specification. For example, a line of CC text has a maximum length of 32 characters (with a few exceptions). CC and DTVCC data contains both text and control codes. In most cases, it may be possible to correct missing or corrupt control codes as well as text.

Poorly Authored Caption Data

Captions often contain errors introduced when they are authored, such as misspelled words. The cause can be operator error by the person or equipment generating the captions. Regardless of the source of error, it is often possible to correct it. Typically a misspelled word is easily detected by a person reading the captions. Either a person or an automated system may detect and correct spelling errors. Control codes within CC data are sometimes required to be repeated and sometimes not. Systems/methods according to some embodiments may correct non-compliant control code sequences. The simplest example is to add redundant control codes when they are missing, or remove redundant control codes when they should not exist. For example, this type of problem may arise if CC data from CC1 is copied into CC3, or vice versa, without adjusting the control codes.

According to some embodiments, caption processing can be performed by extracting closed caption data available in the input source including, for example, CC data and/or DTVCC data, and outputting one or more caption data formats (including but not limited to CC, DTVCC, SAMI, subtitles, and/or teletext). For each possible caption data output, the caption preservation systems/methods may allow selection of one or more desired caption data inputs to source the caption data from and/or selection of one or more caption data formats into which the caption data is to be converted.

Referring to FIG. 1, a caption processing system/method 100 according to some embodiments may include seven sub-systems/methods, namely, input 102, extraction 104, correction 106, translation 108, synchronization 110, caption packaging 112 and insertion/output 114. Although these sub-systems/methods are shown as operating in order in FIG. 1, they may operate in a different order and/or may operate multiple times. Each of these sub-systems/methods is briefly described below.

Input

Caption data can be presented to the input of a caption processing system/method in many different ways, including but not limited to the following:

a) CC data in line 21 of an analog National Television Standards Committee (NTSC) format video signal
b) CC data in line 21 of an NTSC format SDI (serial digital interface) video signal
c) CC data carried in ancillary data of an NTSC SDI video signal
d) DTVCC carried in ancillary data of an SDI video signal
e) CC data carried in user data packets in a compressed digital video bit stream
f) DTVCC data carried in user data packets in a compressed digital video bit stream
g) Subtitle data carried in a subtitle stream within an MPEG2 transport stream
h) Subtitle data carried in various text and binary file formats
i) CC data carried in various text and binary file formats
j) DTVCC data carried in various text and binary file formats
k) Teletext data carried in a teletext stream within an MPEG2 transport stream
l) Teletext data carried in various text and binary file formats
m) Teletext data carried in lines of an analog PAL video signal
n) Teletext data carried in lines of a PAL SDI video signal There are several organizations that create and maintain specifications for storing and transmitting captioning data, such as ATSC (American Television Standards Committee), SCTE (Society of Cable Television Engineers), FCC (Federal Communications Commission), MPEG (Moving Pictures Experts Group), ETSI (European Telecommunications Standards Institute), SMPTE (Society of Motion Picture and Television Engineers), and possibly others. Additionally there are de facto industry standards.

In some embodiments of the present invention, an input sub-system/method 102 finds all of the caption data in the input source(s), whether from electrical signal(s) or file(s). The input sub-system/method 102 then reorders all of the data into presentation order if necessary. The input sub-system/method 102 can optionally compensate for caption data underflow or overflow by adding or removing caption data so that an expected/required data rate is maintained. In the case of adding caption data, null data is typically added. In the case of removing excess caption data, it is generally preferable to remove null data. In fact, the FCC may require that actual non-null characters not be removed. It will be appreciated that correction of caption data overflow/underflow can also be performed in another sub-system/method, such as the translation sub-system/method 108 and/or the caption packaging sub-system/method 112. For example, in some cases, the method of correcting caption data overflow/underflow may be affected by the format to which the data is to be translated and/or stored.

Extraction

In embodiments of the present invention, an Extraction sub-system/method 104 separates all of the existing caption data formats into their constituent channels and buffers them. Caption data and video data may come from the same source, such as an input video stream, or from two physically different sources, such as two files.

For example, CC data contains four channels (CC1, CC2, CC3, CC4). Typically, data in the CC1 channel will need to be translated into DTVCC format and output in DTVCC service 1. To accomplish this, CC1 is first extracted from the incoming CC data. Similarly, the incoming DTVCC data is extracted and separated into its constituent services (up to 63). There may be multiple SAMI, subtitle, and teletext streams. Typically, multiple channels are used to support multiple spoken languages. CC channels 1 and 2 (referred to as CC1 and CC2, respectively) are typically stored and transmitted in an interleaved manner. To separate this interleaved data into individual CC1 and CC2 data streams, the data bytes are interpreted into control codes and characters as specified in the Consumer Electronics Association (CEA) standard CEA-608-C. The control codes indicate whether the succeeding data belongs to CC1 or CC2 (or neither). The same method can be used to separate CC3 and CC4 data. Similarly, DTVCC channels 1 through 63 are interleaved, and to separate the DTVCC data into constituent channels, the data is interpreted according to the standard CEA-708-B.

SAMI, subtitles, and teletext generally have a stream id (a number or tag) associated with them, and if there is data from multiple channels present, each packet of data can be correctly matched with its channel using the stream id.

Correction

In an optional correction sub-system/method 106, errors in the caption data can be corrected. These corrections include but are not limited to one or more of:

a) Using logic and/or automatic spelling checker software to fill in missing and/or corrupt data, including both text and control codes.

b) In an offline scenario, having a person provide the logic and correct spelling.

c) Fixing non-compliant captions. For example CC lines of text that exceed the maximum width (typically 32 characters) may be repaired by either truncating the line to 32 characters or, when possible, adding a new line to display the characters that would otherwise have been truncated and never seen by the viewer.

d) Fixing truncated or poorly authored captions that do not erase themselves after several seconds. This may be accomplished by detecting unexpected sequences of control codes and inserting or removing appropriate control codes to minimize the visible effects. For example, if a caption is stored in non-displayed memory and then overwritten without ever being displayed, this is most likely an error, and the system can insert the necessary control codes to display the caption before it is overwritten.

Translation

There are many different scenarios for video and caption processing with different available caption inputs and desired caption outputs. Therefore, a caption preservation system/method according to some embodiments includes a translation sub-system/method 108 that is configured to translate caption data from one format to another. A typical requirement is to translate one or more channels of CC data to one or more DTVCC services. It should be noted, however, that not all translations are possible. For example, DTVCC is capable of displaying more than 4 lines of text simultaneously whereas CC is limited to 4. Translating CC to DTVCC requires interpreting the CC data according the CEA-608-C specification and generating DTVCC data (according to CEA-708-B) that achieves the same visible result as the original CC data. Such a translator may be implemented by a finite state machine, wherein each byte of CC data that is presented at the input of the translator 108 causes internal state information to be updated and possibly some number of DTVCC bytes to be output. In some cases, caption information may be passed through without translation.

Synchronization

Throughout all of the caption preservation sub-processes, it is important that the synchronization between the caption data and the video data be preserved. Given that caption data can and often does travel through different path(s) from the video data, it may be necessary or desirable to assign timestamps to (and maintain them for) both video and caption data throughout the system. This is especially important when translating between formats or when there is underflow or overflow in the video input, or underflow or overflow in the caption data input. Accordingly, a synchronization sub-system/method 110 may assign timestamps to caption data when it is extracted from the input video stream. The timestamps may be used during or after caption packaging to reorder the caption data so that it can be combined in the proper location/order with video frame data.

Caption Packaging and Reordering

Depending on the combination of caption data being output, it may be necessary or desirable to combine or "package" the caption into a particular format. For example, both CC and DTVCC data may be packaged together by a caption packaging sub-system/module 112 before they are inserted as user data to be associated with a compressed video frame. Depending on the caption data format, the caption data may or may not need to be output in tandem with individual video frames. If it does, then it must be reordered in the same manner as the video frames—i.e., into coded order. The possible caption data outputs include but are not limited to, CC, DTVCC, SAMI, Teletext, and Subtitle data.

It should be noted that even if there is no caption data present at the input, the system can still perform a useful function in that it can output "null" CC and DTVCC data of the correct size and format in the correct location. This allows for downstream equipment to easily insert valid closed captioning data.

Insertion and Output

After the caption data has been packaged, it is inserted into the appropriate locations in the output video stream by an insertion sub-system/module 114. The output video stream may be output to a transmission and/or storage medium. In the case of SAMI, the captions are written to a separate file.

Figure 2:
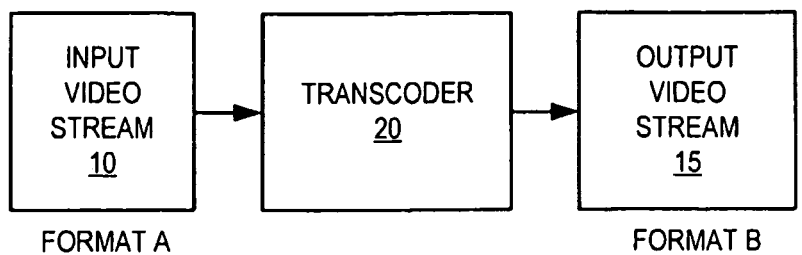
FIGS. 2-6 are block diagrams of video transcoding systems/methods according to some embodiments.

A video transcoding system according to some embodiments is illustrated in functional block diagram form in FIG. 2. As shown therein, a transcoder 20 receives an input video stream 10 including associated caption data in a first format (Format A). The transcoder 20 processes the input video stream 10 including the associated caption data and responsively generates an output video stream 15 that has been transcoded into a second video format (Format B). The output video stream 15 includes processed caption data that is in a form that is appropriate for the second video format.

Figure 3:
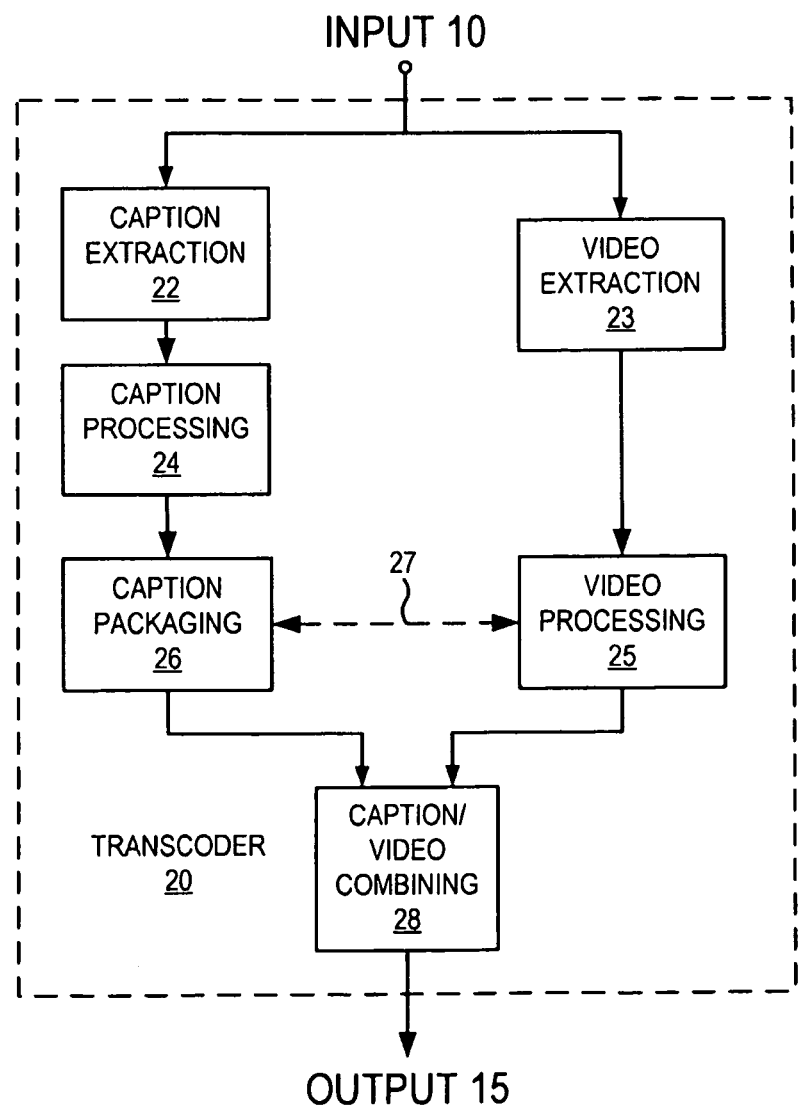

A transcoder 20 according to some embodiments is illustrated in more detail in FIG. 3. As shown therein, the input video stream 10 is provided to both a caption extraction module 22 and a video extraction module 23. The caption extraction module 22 extracts the caption data from the input video stream 10. As noted above, the caption data may be stored in the input video stream in a number of different formats, including CC, DTVCC, SAMI, Subtitle, and/or Teletext. The caption extraction module 22 may also parse the input video stream 10 to determine ordering of the input data frames so that the caption data can be reordered into presentation order. Furthermore, the caption extraction module 22 can assign timestamps to the caption data to facilitate later re-ordering and combination of the processed caption data with the transcoded video frames. The video extraction module 23 extracts the video frames and may reorder the video frames in preparation for processing. When the video frames are reordered, the video extraction module 23 may also perform rendering to generate video frames for processing from coded video data.

The extracted captions are processed by a caption processing module 24. The caption processing module 24 may perform the operations of Correction and Translation described above. That is, the caption processing module 24 may correct errors in the caption data (including errors in text and/or control codes), and may translate the caption data from one format to another.

The caption packaging module 26 constructs the caption data packet that is to be inserted into the output video stream 15. The output can be formatted as compressed digital bitstream user data, SDI ancillary data, vertical blanking interval (VBI), and/or others. A number of parameters, such as output frame rate, ivt flags, interlace vs. progressive scanning, etc., may affect operation of this component. The caption packaging module 26 combines CC and DTVCC data produced by the caption processing module 24 into a form that is required for combining with video and/or writing directly to the output 15.

The video processing module 25 performs the function of transcoding the input video stream (excluding the caption data) from the first video format to the second video format. For example, the video processing module 25 can transcode the input video stream from a format, such as SDI, ASI, MPEG2, VC-1, H.264, NTSC, or PAL, to another format. The video processing module 25 may re-order the output video frames into encoded order. The video processing module 25 may transcode the video to the same format, but change other parameters such as bit rate, image size, etc.

The caption/video combining module 28 inserts the packaged caption data into appropriate locations in the transcoded video stream output by the video processing module 25. In order to do so, the caption/video combining module 28 may examine time stamps associated with the caption data and may reorder the caption data to match the ordering of the frames output by the video processing module 25. The caption/video combining module 28 may also parse the output video stream provided by the video processing module 25 to determine the coded order of frames, which may be based on a particular coding scheme used by the video processing module 25. The caption/video combining module 28 may output caption data of multiple formats to multiple destinations, for example CC and DTVCC may be output to the same file as the video and SAMI may be written to a separate file. Similarly, CC and DTVCC may be written to both the video file and to a separate file.

In some embodiments, the video processing module 25 may reserve space in the output video stream for caption data. However, doing so may unnecessarily reduce video quality, because some video frames may not have any associated caption data. Accordingly, in some embodiments, the caption packaging module 26 and the video processing module 25 may communicate via an optional communication path 27. For example, the caption packaging module 26 can transmit information to the video processing module 25 concerning how much space the video processing module needs to reserve in a particular frame (which can be identified by frame number and/or time stamp). Likewise, the video processing module 25 can transmit information to the caption packaging module 26 via the communication path 27 concerning the frame ordering and/or frame timing. Frame timing may be particularly important in cases where the output video stream 15 is encoded with a different frame rate than the input video stream (e.g. 24 fps vs. 30 fps). Knowledge of the frame timing can assist the caption packaging module 26 in synchronizing the caption data with the output video frames.

In some embodiments, the caption packaging module 26 can provide a target bit rate to the video processing module 25 based on the amount of caption data processed by the caption packaging module 26. For example, the caption packaging module 26 may instruct the video processing module to encode the video at a lower bit rate to avoid potential bandwidth/timing problems when the video stream (including caption data) is decoded by a subsequent receiver. The video processing module 25 may then encode the video stream at the target bit rate provided by the caption packaging module 26. Then, when the caption data is combined with the video data, the total bandwidth occupied by the output video stream 15 may not exceed a maximum allowable bandwidth. One drawback to this approach is that the actual bit rate of the output video stream 15 may be different than the encoded bit rate written into the video stream by the video processing module 25, which may cause difficulty for a downstream multiplexer. That is, the bit rate used by the encoder is stored in the encoded video stream. However, the actual bit rate of the stream after the caption data is inserted, may be greater than the encoded bit rate. The actual bit rate may therefore be different from the encoded bit rate that is expected by a downstream video processing module such as a multiplexer.

Figure 4:
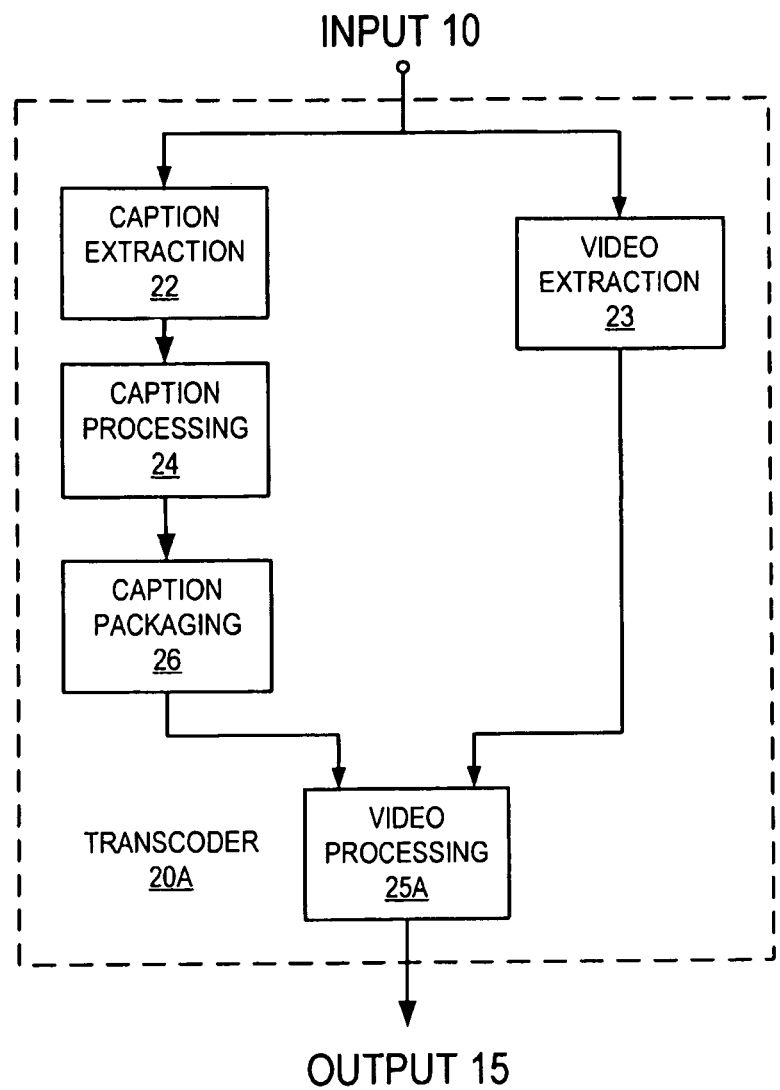

A transcoder 20A according to further embodiments is illustrated in FIG. 4. The transcoder 20A includes a caption extraction module 22, a video extraction module 23, a caption processing module 24 and a caption packaging module 26, each of which may operate in a manner as described above with respect to FIG. 3. However, in the transcoder 20A, the caption packaging module 26 provides the packaged caption data directly to a video processing module 25A. The video processing module 25A receives the video frames for processing and inserts the packaged caption data directly into the processed video stream. Since the video processing module 25A knows how many bits are included in the caption data, the video processing module 25A can adjust compression of the video frames to achieve a desired overall bit rate, taking into account the number of bits of caption data present. Thus, the encoded bit rate and the actual bit rate of the encoded video frames output by the video processing module 25 will be the same.

Figure 5:
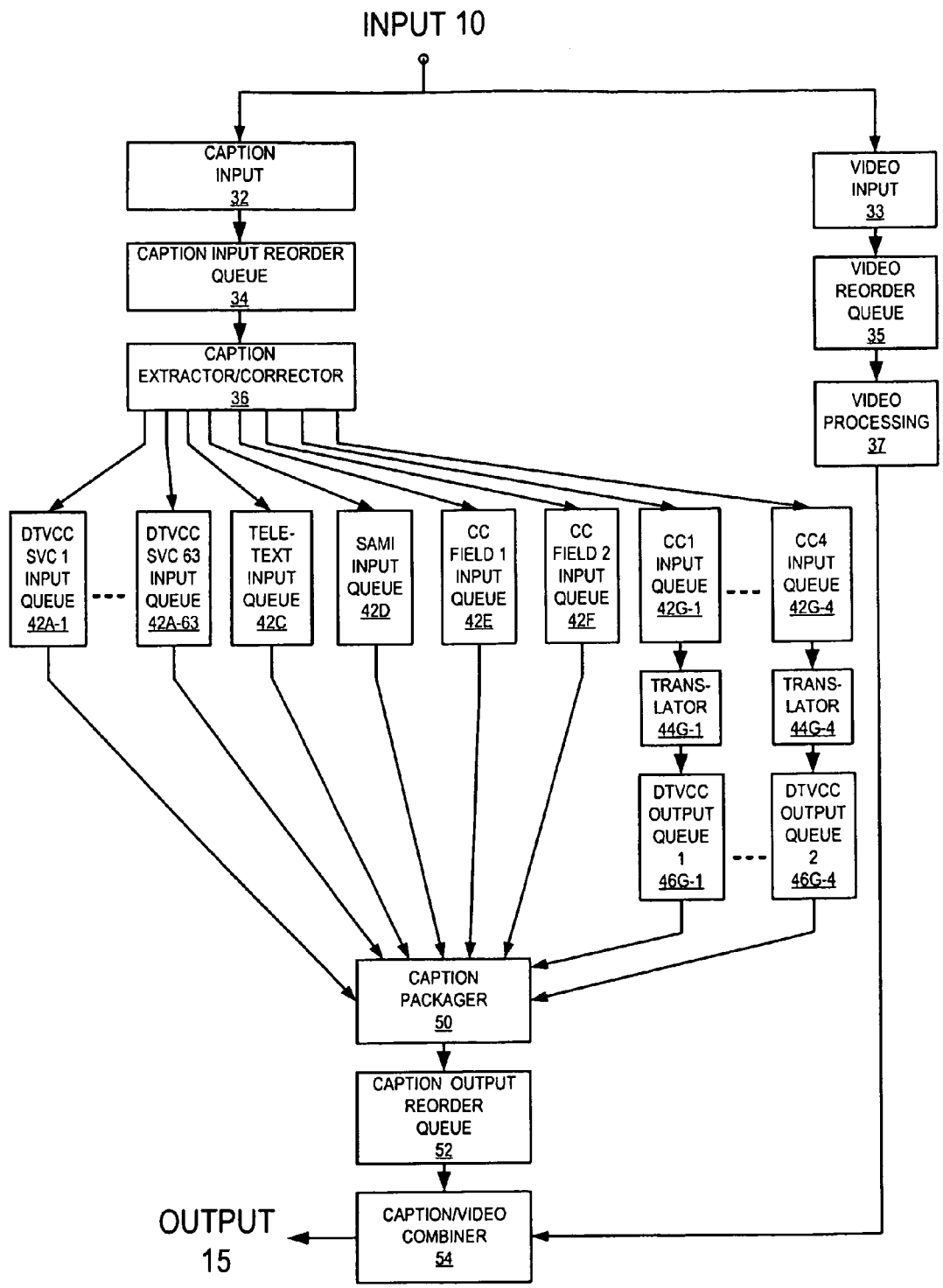

FIG. 5 illustrates video transcoding system/methods according to further embodiments. As shown therein, an input video stream 10 is provided to a caption input module 32 and a video input module 33. The video input module receives video frames from the input video stream 10 and passes the video frames to a video reorder queue 35, which reorders the video frames into presentation order if necessary. The video frames are then transcoded by a video processing module 37.

The caption input module 32 locates the caption data associated with each frame in the input video stream 10, converts the caption data to an intermediate format, and passes it to a caption input reorder queue 34 to be reordered into presentation order and then stored on a queue. As noted above, "presentation order" is the order in which the video frames would be displayed on a television, and is sometimes different from the encoded order in which digital video frames are stored and transmitted. The caption input module 32 is configured to receive and process caption data from compressed video bit stream user data, SDI ancillary data, VBI (Vertical Blanking Interval) of a video signal (e.g. line 21), text file, binary file, and possibly other locations. The intermediate format to which the caption data is converted can be, for example, an Advanced Television Systems Committee (ATSC) format used in MPEG2 streams (A/53, Revision B Annex A Section 5.2.2), which can contain CC and/or DTVCC data. This format (or similar variations) can be easily constructed regardless of where the CC or DTVCC data originates. However, the intermediate format can be any convenient format. In some embodiments, the intermediate format can be chosen based on its flexibility to handle multiple types of caption/subtitle data.

After reordering, the caption data is provided to a caption extractor/corrector 36, which separates the caption data into data associated with respective DTVCC services, and both fields of CC. If there is to be translation of CC to DTVCC or any other caption format, the caption extractor/corrector 36 further separates the CC field 1 data into CC1 and CC2 channels, and further separates the CC field 2 data into CC3 and CC4 channels. The caption extractor/corrector 36 selectively provides caption data to one or more input queues, depending on the type of caption data that is desired/required to be placed into the output stream. For example, the caption extractor/corrector 36 can supply caption data to DTVCC input queues 42A-1 to 42A-63 corresponding to DTVCC services 1 through 63. Furthermore, the caption extractor/corrector 36 can supply caption data to a teletext input queue 42C, a SAMI input queue 42D, a CC Field 1 input queue 42E, a CC Field 2 input queue 42F, and CC1 to CC4 input queues 42G-1 to 42G-4.

The CC1 to CC4 input queues 42G-1 to 42G-4 may be provided in addition to the input queues 42E, 42F for CC Field 1 and CC Field 2 if any of the CC1 through CC4 channels are to be translated and output to one or more DTVCC services or other outputs (e.g. SAMI, subtitles, teletext).

The caption extractor/corrector 36 can reduce the risk of caption data overflow by computing the amount of closed caption data that should be buffered. Upon finding an overflow, the caption extractor/corrector 36 may discard null characters.

The caption extractor/corrector 36 may further correct errors in the text and/or coding of the caption data, for example, using a spell-checking algorithm to detect/correct for spelling errors in the text and/or a logic-checking algorithm to detect/correct errors in control codes included in the caption data.

One or more translators 44G-1 to 44G-4 may be provided to interpret CC text and control codes from CC channels CC1 to CC4, respectively, and translate such text/codes into DTVCC text and control codes. CC operates in one of three modes (Roll-Up, Pop-On, or Paint-On). Accordingly, the translators 44G-1 to 44G-4 may have the same three modes of operation. In addition, the translators 44G to 44G-4 may detect changes from one mode to another. Additional translators may be provided if it is desired to translate the CC data to other output types, such as SAMI, teletext, etc. The translated caption data is then provided to one or more output queues 46G-1 to 46G-4. Data from each of the output queues is provided on demand to a caption packager 50.

The caption packager 50 constructs caption data packets that are to be inserted into the output video stream 15. The operation of the caption packager 50 is similar to that of the caption packaging module 26 illustrated in FIGS. 3 and 4, and need not be described further.

A caption output reorder queue 52 at the output of the caption packager 50 may be employed if the presentation order and transmission order of the video output are different. Correct reordering of video frames (and/or associated caption data) is enabled by determining the relationship between display (presentation) order and transmission (coded) order. If correct timestamps are available for all video frames, then the caption data can be sorted so that the associated timestamps are monotonically increasing. However, it is possible that the output video stream from the video processing module 37 will have to be parsed and interpreted to determine the relationship between display order and transmission order. This parsing and interpretation generally requires information specific to the video compression format being employed, and can be provided, for example, as a setting for the caption output reorder queue 52 or can be provided by the video processing module 37.

The reordered captions are then combined with the transcoded video frames by a caption/video combiner module 54, and the combined frames are output as the output video 15.

Figure 6:
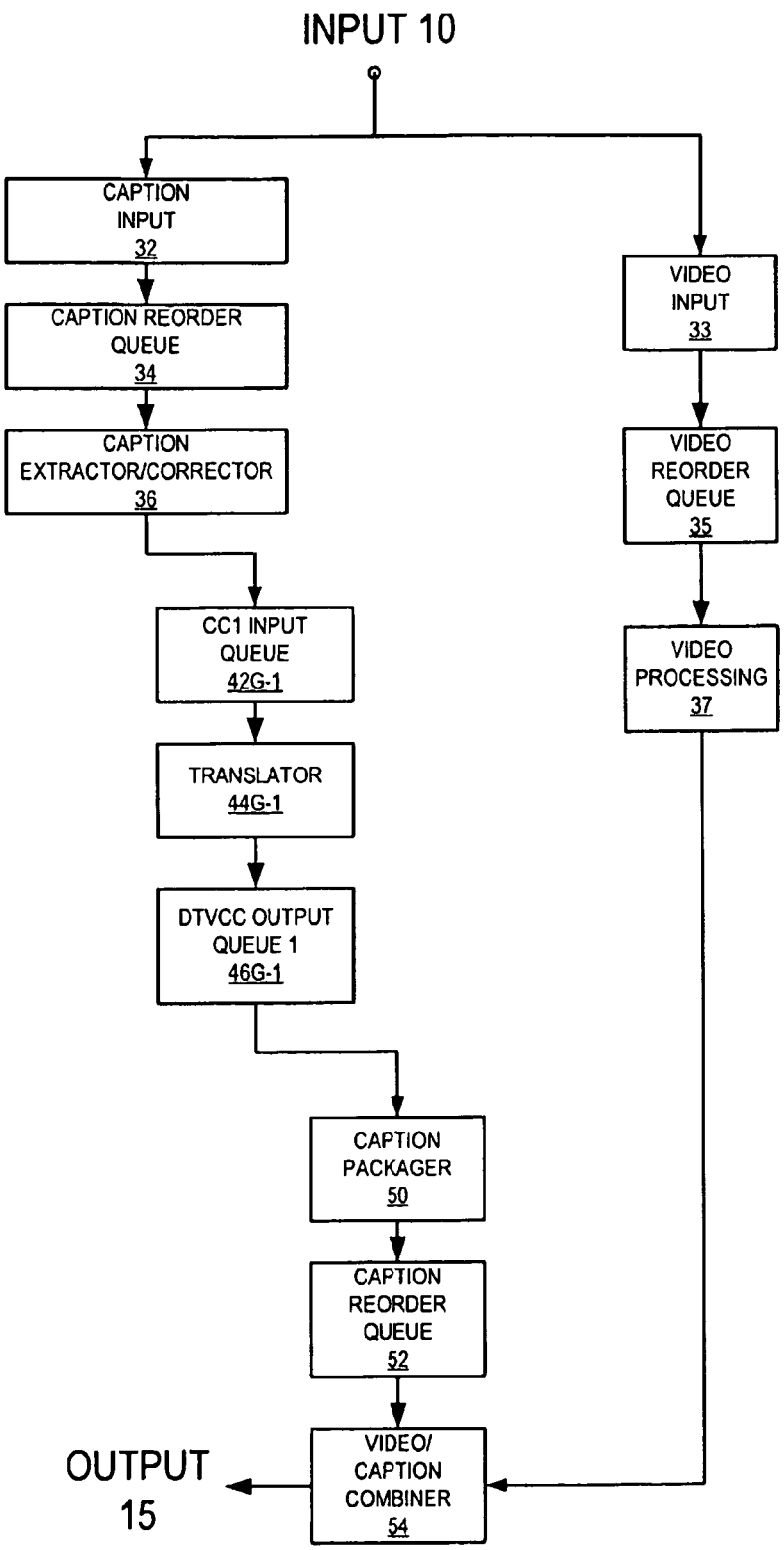

Particular embodiments are illustrated in FIG. 6. Components illustrated in FIG. 6 operate in a similar manner as corresponding components having similar reference numbers shown in FIG. 5. As shown in FIG. 6, an input source 10 including CC data in at least channel CC1 is provided to the caption input module 32. The caption data is reordered and placed into the caption input reorder queue 34. The caption data is then extracted and optionally corrected by the caption extractor/corrector 36. In the embodiments illustrated in FIG. 6, it is desired to translate caption data in channel CC1 to DTVCC data. Thus, the extracted caption data is placed into the CC1 input queue 42G-1, which provides the caption data to the translator 44G-1. The translator 44G-1 translates the caption data into DTVCC format and places the translated caption data into the DTVCC output queue 1 46G-1, corresponding to DTVCC service 1. The translated caption data is then packaged by the caption packager 50 and optionally placed into the caption output reorder queue 52 for reordering into coded order. Finally, the caption data is combined with video frames output by the video processing module 37 to form the output data stream 15.

Some embodiments of the present invention are described with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method, comprising:
    parsing an input video stream to determine a presentation order of encoded frames in the input video stream;
    if audio data is present, processing the audio data independently of the input video stream and caption data;
    reordering the caption data into the presentation order, the caption data extracted from the input video stream;
    assigning time stamps to the caption data;
    translating the caption data from closed caption data into an output caption format, the output caption format being a different format than a format of the closed caption data;
    providing a target bit rate based on an amount of the caption data to be inserted into a preliminary output video stream;
    transcoding the input video stream, excluding the caption data, into the preliminary output video stream at the target bit rate, a frame rate of the input video stream being different from a frame rate of the preliminary output video stream;
    reordering the caption data in the output caption format into a coded order of encoded frames in the preliminary output video stream, based on the time stamps of the caption data; and
    writing the caption data in the output caption format to a same file as the preliminary output video stream.

2. The method of claim 1, further comprising:
    generating a caption data file including caption data output to the preliminary output video stream.

3. The method of claim 1, further comprising:
    detecting a caption data underflow or overflow in the caption data; and
    compensating for the caption data underflow or overflow in the caption data by modifying the caption data.

4. The method of claim 3, wherein the compensating for the caption data underflow or overflow in the caption data comprises adding null data to the caption data in the case of the caption data underflow, and deleting null data in the caption data in the case of the caption data overflow.

5. The method of claim 1, further comprising:
    correcting at least one of a text error and a coding error in the caption data, wherein the reordering is performed in response to the correcting.

6. The method of claim 1, further comprising:
    converting the caption data into an Advanced Television Systems Committee (ATSC) format before translating the caption data from the ATSC format into at least one output caption format.

7. The method of claim 1, further comprising:
    buffering the caption data before packaging the caption data into data packets to be inserted into the preliminary output video stream.

8. The method of claim 1, wherein the parsing the input video stream comprises the assigning the time stamps to the caption data.

9. The method of claim 1, further comprising:
    parsing the preliminary output video stream to determine the coded order of the encoded frames in the preliminary output video stream.

10. The method of claim 1, further comprising:
    inserting the caption data in the output caption format into spaces in the preliminary output video stream.

11. The method of claim 1, further comprising:
    packaging the translated caption data into data packets; and
    synchronizing the packaged caption data with the preliminary output video stream.

12. The method of claim 1, wherein, when the caption data is combined with the preliminary output video stream, a total bandwidth occupied by the preliminary output video stream does not exceed a maximum allowable bandwidth.

13. A system, comprising:
    a caption input reorder queue configured to reorder caption data into a presentation order of encoded frames in an input video stream, the caption data extracted from the input video stream;
    a caption extraction module configured to parse the input video stream to determine the presentation order of the encoded frames and to assign time stamps to the caption data;
    a caption processing module configured to translate the caption data from closed caption data into an output caption format, the output caption format being a different format than a format of the closed caption data;
    a caption packaging module configured to provide a target bit rate based on an amount of the caption data to be inserted into a preliminary output video stream;
    a video processing module configured to transcode the input video stream, excluding the caption data, into the preliminary output video stream at the target bit rate, a frame rate of the input video stream being different from a frame rate of the preliminary output video stream, wherein, if audio data is present, the audio data is processed independently of the input video stream and the caption data, and the caption packaging module is configured to synchronize the caption data in the output caption format with the preliminary output video stream; and
    a combining module configured to reorder the caption data in the output caption format into a coding order of encoded frames in the preliminary output video stream, based on the time stamps of the caption data, and to write the caption data in the output caption format to a same file as the preliminary output video stream.

14. The system of claim 13, wherein the caption packaging module is configured to retrieve caption data having one or more different caption formats for packaging.

15. The system of claim 13, wherein the caption extraction module is configured to compute an amount of the caption data to avoid a caption data overflow by discarding a null character of the caption data.

16. The system of claim 13, wherein the caption packaging module is configured to organize the caption data into caption data packets to be inserted into the preliminary output video stream.

17. The system of claim 13, wherein the combining module is configured to insert the caption data in the output caption format into the preliminary output video stream.

18. The system of claim 17, wherein the caption packaging module is configured to obtain frame ordering and/or timing information for the preliminary output video stream from the video processing module.

19. A system, comprising:
a caption extraction module configured to parse an input video stream to determine a presentation order of encoded frames in the input video stream and to assign time stamps to caption data extracted from the input video stream, wherein the caption data is reordered into the presentation order;
a caption processing module configured to translate the caption data from closed caption data into an output caption format, the output caption format being a different format than a format of the closed caption data; and
a caption packaging module configured to provide a target bit rate based on an amount of the caption data to be inserted into an output video stream and to provide the caption data in the output caption format to a video processing module that transcodes the input video stream, excluding the caption data, into the output video stream at the target bit rate, a frame rate of the input video stream being different from a frame rate of the output video stream, wherein, if audio data is present, the audio data is processed independently of the input video stream and caption data, and the caption data in the output caption format is reordered into a coded order of encoded frames in the output video stream, based on the time stamps of the caption data, and the caption data in the output caption format is written to a same file as the output video stream.

20. The system of claim 19, wherein caption data associated with a video frame is inserted into the preliminary output video stream in response to a recognition that the video frame has been discarded.

21. The system of claim 19, wherein the video processing module adjusts a compression of the encoded frames in the output video stream.

22. A non-transitory, computer readable storage medium having computer readable program code embodied in the medium, the program code, when executed, causing a processing unit to perform a method comprising:
parsing an input video stream to determine a presentation order of encoded frames in the input video stream;
if audio data is present, processing the audio data independently of the input video stream and caption data;
reordering the caption data into the presentation order, the caption data extracted from the input video stream;
assigning time stamps to the caption data;
translating the caption data from closed caption data into an output caption format, the output caption format being a different format than a format of the closed caption data;
providing a target bit rate based on an amount of the caption data to be inserted into a preliminary output video stream;
transcoding the input video stream, excluding the caption data, into the preliminary output video stream at the target bit rate, a frame rate of the input video stream being different from a frame rate of the preliminary output video stream;
reordering the caption data in the output caption format into a coded order of encoded frames in the preliminary output video stream, based on the time stamps of the caption data; and
writing the caption data in the output caption format to a same file as the preliminary output video stream.

23. The storage medium of claim 22, the method further comprising:
inserting a control code into caption data to display a caption, if the caption is stored in a non-displayed memory and is overwritten without ever being displayed.

24. The storage medium of claim 22, the method further comprising:
computing an amount of closed caption data to be buffered; and
deleting null data in the caption data, if an overflow is detected in the caption data.

25. The storage medium of claim 22, wherein, when the caption data is combined with the preliminary output video stream, a total bandwidth occupied by the preliminary output video stream does not exceed a maximum allowable bandwidth.

* * * * *